DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

983 O.G. 401

T893,001
ULTRASONIC CLEANING PROCESS AND APPARATUS

John D. Fisler, Kodak Park Works, 1669 Lake Ave., Rochester, N.Y. 14650

Filed Mar. 12, 1970, Ser. No. 18,884
Int. Cl. B08b *3/10;* G03g *13/00, 15/00*
U.S. Cl. 134—1
1 Sheet Drawing. 10 Pages Specification

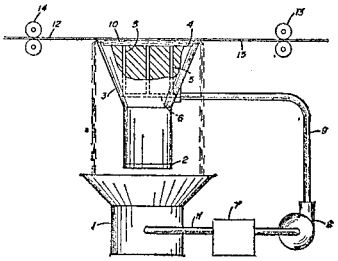

Ultrasonic energy is used to create turbulence in a bead of liquid through which is a xerographic element is moved for removing toner particles from the image-bearing surface thereof, thereby preparing the element for further use. The toner particles can be distributed over the surface in the form of an image or as residual toner particles that were not picked up in the course of transferring the image to a receiver sheet. The liquid is continuously circulated and a device is included for filtering out the toner particles that have been removed.

Dec. 14, 1971 J. D. FISLER T893,001
ULTRASONIC CLEANING PROCESS AND APPARATUS
Filed March 12, 1970
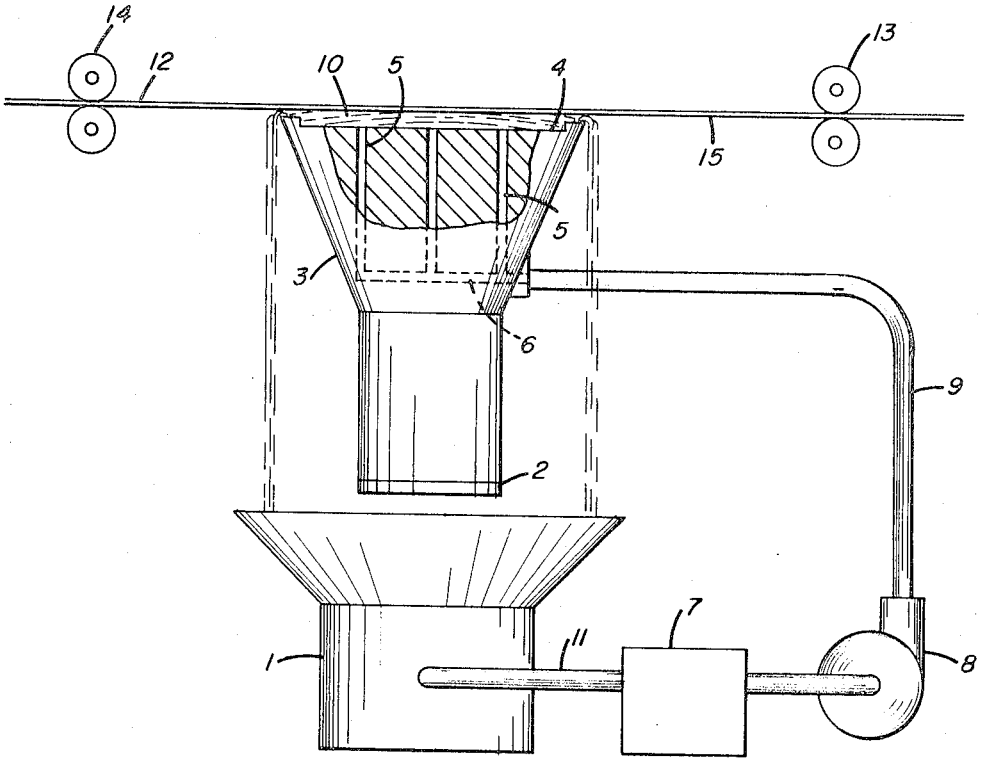
JOHN D. FISLER
INVENTOR.
BY Lloyd F. Seebach
AGENT